United States Patent
Stevanovic et al.

(10) Patent No.: US 9,963,012 B2
(45) Date of Patent: May 8, 2018

(54) PERSONALIZING VEHICULAR COMFORT SETTINGS FOR A SPECIFIC USER

(71) Applicant: GM GLOBAL TECHNOLOGY OPERATIONS LLC, Detroit, MI (US)

(72) Inventors: Miroslav Stevanovic, Concord (CA); Hassan Elnajjar, Dearborn, MI (US); Neeraj R. Gautama, Whitby (CA); Opeyemi Adesina, Ottawa (CA); Vahdat Abdelzad, Ottawa (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days. days.

(21) Appl. No.: 14/961,808

(22) Filed: Dec. 7, 2015

(65) Prior Publication Data

US 2017/0158023 A1 Jun. 8, 2017

(51) Int. Cl.
*B60H 1/00* (2006.01)
(52) U.S. Cl.
CPC ..... *B60H 1/00971* (2013.01); *B60H 1/00771* (2013.01); *B60H 1/00785* (2013.01)
(58) Field of Classification Search
CPC .. G01C 21/3469; G06F 17/5009; G06N 5/02; G06N 99/005; G07C 9/00087; G07C 9/00563; B60K 17/3467; B60L 1/00; B60R 16/037; B60R 2325/101; B60R 25/257
USPC .......... 701/2, 99; 704/201; 706/46; 477/107; 370/395.2; 340/439
See application file for complete search history.

(56) References Cited

U.S. PATENT DOCUMENTS

| 5,937,940 | A | 8/1999 | Davis, Jr. et al. |
| 6,145,751 | A | 11/2000 | Ahmed |
| 6,616,057 | B1 | 9/2003 | Kelly et al. |
| 9,461,496 | B1* | 10/2016 | Zhang ..................... H02J 7/007 |
| 2001/0029221 | A1* | 10/2001 | Oliveira ............ B60W 30/1819 477/107 |
| 2004/0220798 | A1* | 11/2004 | Chi ....................... B60R 25/257 704/201 |
| 2007/0121641 | A1* | 5/2007 | Hovey .................... H04L 67/02 370/395.2 |
| 2011/0309926 | A1* | 12/2011 | Eikelenberg ....... G01C 21/3469 340/439 |

(Continued)

*Primary Examiner* — Anne M Antonucci
*Assistant Examiner* — Sanjeev Malhotra
(74) *Attorney, Agent, or Firm* — Harness, Dickey & Pierce, P.L.C.

(57) ABSTRACT

An application is launched in response to identifying a specific user in the vehicle. Upon launching the application, a historical comfort setting profile is automatically downloaded for the user. The historical profile includes individual comfort setting records. The historical profile is updated with comfort setting record(s) corresponding to each instance of an automatic climate control setting, a manual climate control setting, or an alternate climate control setting while the specific user is in the vehicle. An in-vehicle setting is dynamically predicted within respective predetermined time increments while the specific user is in the vehicle or in response to a user request. The predicted in-vehicle setting is dependent upon geographic location data points and a set of climate control related settings retrieved from the individual comfort setting records. A most recently predicted in-vehicle setting is caused to be displayed on a vehicle display while the specific user is in the vehicle.

20 Claims, 2 Drawing Sheets

(56) References Cited

U.S. PATENT DOCUMENTS

| | | |
|---|---|---|
| 2012/0305661 A1 | 12/2012 | Malchiondo et al. |
| 2013/0151454 A1* | 6/2013 | McCarthy ................ G06N 5/02 706/46 |
| 2014/0200742 A1* | 7/2014 | Mauti, Jr. ............... F02D 29/02 701/2 |
| 2015/0046060 A1* | 2/2015 | Nikovski ............. B60R 16/037 701/99 |

* cited by examiner

PERSONALIZING VEHICULAR COMFORT SETTINGS FOR A SPECIFIC USER

TECHNICAL FIELD

The present disclosure relates generally to personalizing vehicular comfort settings for a specific user.

BACKGROUND

Vehicles are often equipped with in-vehicle communications platforms (e.g., telematics unit and/or infotainment units) and other components. Often, the electronic features associated with at least some of these components can be programmed to reflect a user's preference. These preferences can be set using an in-vehicle display, or in some instances, through a web page and a user account that is linked to the vehicle.

SUMMARY

In an example of a method for personalizing vehicular comfort settings for a specific user, an application is autonomously launched in response to identifying a specific user in the vehicle. Upon launching the application, a historical comfort setting profile is automatically downloaded for the user. The historical comfort setting profile includes individual comfort setting records. The historical comfort setting profile is autonomously updated with comfort setting record(s) corresponding to each instance of an automatic climate control setting, a manual climate control setting, or an alternate climate control setting while the specific user is in the vehicle. An in-vehicle setting is dynamically predicted within respective predetermined time increments while the specific user is in the vehicle or in response to a user request. The predicted in-vehicle setting is dependent upon geographic location data points and a set of climate control related settings retrieved from the individual comfort setting records. A most recently predicted in-vehicle setting is caused to be displayed on a vehicle display while the specific user is in the vehicle.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Examples of the system and method disclosed herein utilize a specific user's historical comfort setting profile to dynamically predict an in-vehicle setting within predetermined time increments while the specific user is in any vehicle or in response to a user request. The historical comfort setting profile includes individual comfort setting records, where each comfort setting record includes data associated with a climate control related setting that was implemented or identified while the user was in a vehicle. An in-vehicle adaptation application collects the data, such as vehicle geographic location data point(s) when the climate control related setting was implemented or identified, time/date data point(s) when the climate control related setting was implemented or identified, and the type of climate control related setting that was implemented or identified. This data is stored in the historical comfort setting profile. During a subsequent vehicle trip, the specific user is recognized within the vehicle and his/her profile is downloaded to the vehicle. During this trip (and while the user is in the vehicle), the historical comfort setting profile is updated when an automatic, manual, or alternate climate control setting is recognized. Also during this trip, the user is provided with a most recently predicted in-vehicle setting that is a probable candidate for an in-vehicle setting at the particular time(s) that the user is in the vehicle. The predicted in-vehicle setting(s) may be generated in response to a request from the user, or may be routinely updated while the user is in the vehicle.

It is believed that the inclusion of the time and date of data point collection and/or vehicle location data in the vehicle comfort setting records improves the accuracy of the predictions that are made, and thus improves the technological process of providing personalized in-vehicle services. The historical data may depict a pattern in which the specific user implements particular in-vehicle settings at a particular time/date and/or vehicle location. As such, the inclusion of time and date data and/or location data when determining the probability that an in-vehicle setting will be implemented increases the accuracy of the results.

Figure 1:
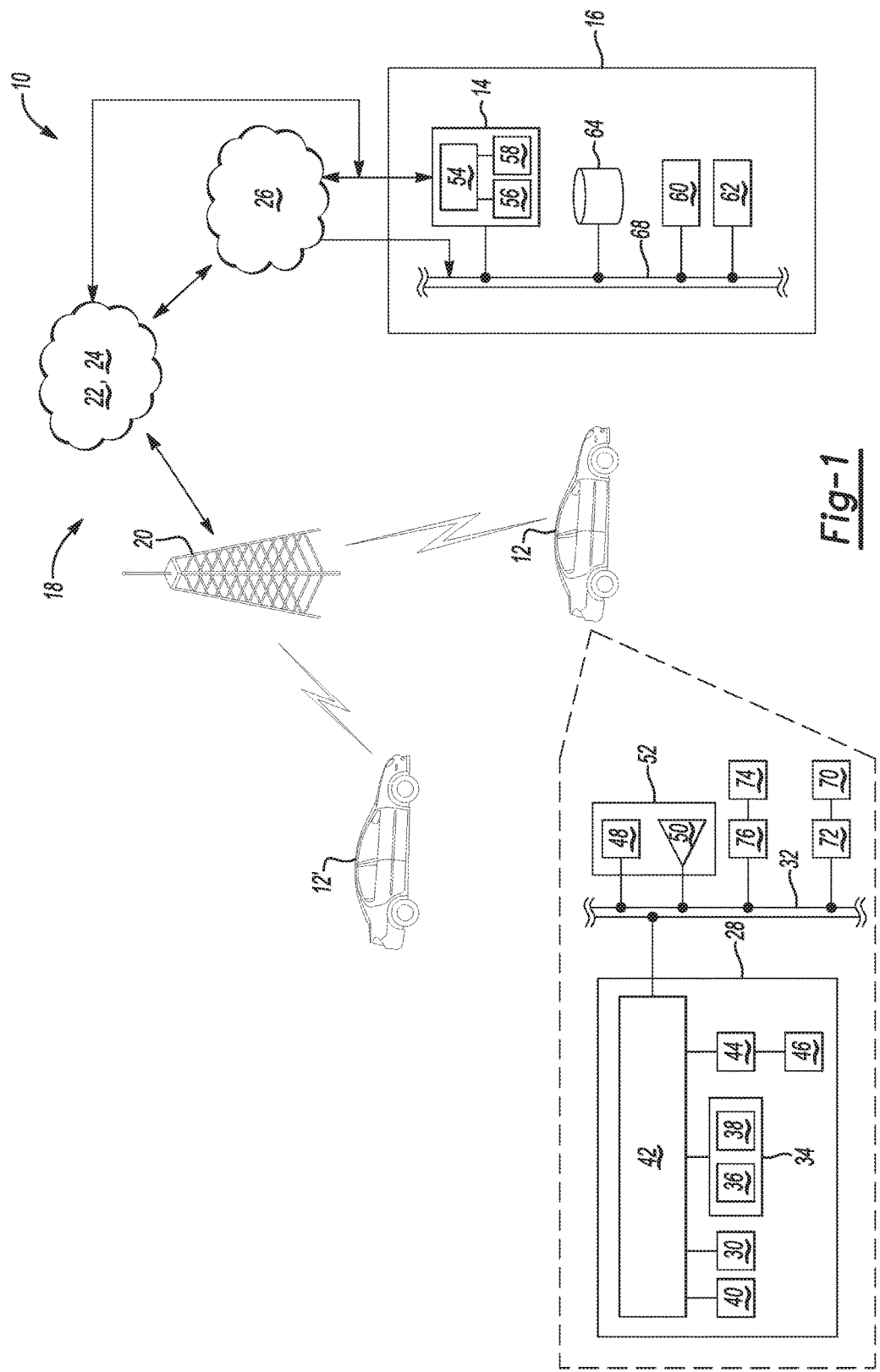
FIG. 1 is a schematic view of an example of a system for personalizing vehicular comfort settings for a specific user.

Referring now to FIG. 1, an example of a system 10 for personalizing vehicular comfort settings for a specific user is depicted. The system 10 includes one or more vehicles 12, 12' associated with the specific user, a server 14 (which may be part of a center 16 that provides back-end services to the vehicles 12, 12'), and a carrier/communication system 18.

Phone calls and/or messages (e.g., downloaded profiles, etc.) may be transmitted to, from, and/or between communication component(s) of the vehicle(s) 12, 12' and the center 16 using the carrier/communication system 18. Some of the communication links between the various components are shown as lightning bolts and arrows in FIG. 1.

In an example, the carrier/communication system 18 is a two-way radio frequency (RF) communication system. The carrier/communication system 18 may include one or more cell towers 20 or satellites (not shown). It is to be understood that the carrier/communication system 18 may also include one or more base stations and/or mobile switching centers (MSCs) 22 (e.g., for a 2G/3G network), one or more evolved Node Bs (eNodeB) and evolved packet cores (EPC) 24 (for a 4G (LTE) network), and/or one or more land networks 26. The carrier/communication system 18 may be part of a cellular radio environment or a satellite radio environment, which may include a variety of wireless network providers (which include mobile network operator(s), not shown), utilizing the same or a variety of radio access technologies. While several examples have been provided, it is to be understood that the architecture of the wireless carrier/communication system 18 may be GSM (global system for mobile telecommunications), CDMA2000, UMTS (universal mobile telecommunications system), LTE (long-term evolution), or some other available architecture.

An Internet connection may also be utilized for the transmission of the message(s), data, etc. The transmission of the messages, data, etc. may be made using the carrier/ communication system 18, either through the vehicle's Internet connection (e.g., when the vehicle 12, 12' is equipped with a 4G long-term evolution, LTE, or other suitable Internet connection) or through a mobile device's cellular and Internet connection (when the mobile device is present in the vehicle 12, 12' and is in wireless communication with the vehicle 12, 12').

The vehicle 12, 12' may be a car, motorcycle, truck, or recreational vehicle (RV) that is associated with the specific user. A vehicle 12, 12' is considered to be associated with the specific user when the specific user can be recognized or identified upon entering the vehicle 12, 12'. In some examples, the vehicle 12, 12' includes some recognition system that can identify the specific user. In an example, the specific user can be recognized through his/her mobile device. When the specific user enters any vehicle 12, 12', his/her mobile device may wirelessly connect (via any short range wireless technology) to a vehicle communications platform (VCP) 28 of the vehicle 12, 12'. The VCP 28 may have the mobile device identifier (e.g., phone number, serial number, etc.) stored in a memory 44 thereof, and may retrieve the user that is linked to the mobile device identifier in the memory 44. When multiple mobile devices are recognized by the VCP 28, the VCP 28 may prompt the in-vehicle occupants to identify which of the identified occupants is the driver. For example, a voice prompt or a display prompt may indicate which potential drivers have been recognized by their mobile devices, and request that the in-vehicle occupants select one of the potential drivers who will be driving this trip. Alternatively, the VCP 28 may use data from a peripheral device (e.g., a camera, a fingerprint pad, a retinal scanner, or another biometric device) to identify who is in the driver's seat.

In other examples, the vehicle 12, 12' uses an off-board recognition system that can identify the specific user. For example, the VCP 28 may alternatively transmit the mobile device identifier of the recognized mobile device to the server 14, which uses the information to identify the specific user. When multiple mobile device identifiers are recognized, the VCP 28 may also transmit data from a peripheral device (e.g., a camera, a fingerprint pad, a retinal scanner, or another biometric device) indicating who the driver is to the server 14. In this example, the identity of the specific user is then determined by the server 14, and is transmitted to the VCP 28 from the server 14, so the vehicle 12, 12' knows who the specific user is.

The vehicle 12, 12' may be owned by the specific user, or the specific user may be an authorized user of the vehicle 12, 12', or the specific user may be previously unaffiliated with the vehicle (e.g., a fleet vehicle, rental vehicle, or borrowed vehicle, etc.), as long as the vehicle 12, 12' has the capability of identifying the specific user using the server 14.

The vehicles 12, 12' are equipped with suitable hardware and computer readable instructions/code that enable it to communicate (e.g., transmit and/or receive voice and data communications) over the carrier/communication system 18 (e.g., with the server 14). In some instances, the vehicle(s) 12, 12' are also capable of communicating using a short range wireless communication link. The components of vehicle 12 will be described in more detail, although it is to be understood that each of the other vehicles 12' may be equipped with the same or similar components.

As shown in FIG. 1, the vehicle 12 includes the previously mentioned vehicle communication/communications platform (VCP) 28. In an example, the VCP 28 is an on-board vehicle dedicated communications and entertainment device. In another example (not shown), the VCP 28 is an on-board vehicle dedicated communications device (e.g., a telematics unit), and the vehicle 12 includes a separate on-board vehicle dedicated entertainment device (e.g., an infotainment unit). Whether integrated into a single unit (e.g., VCP 28) or included as separate units, the on-board vehicle dedicated communications and entertainment device(s) include hardware components that are capable of running computer readable instructions/code, which are embodied on non-transitory, tangible computer readable media.

The VCP 28 may provide a variety of services, both individually and through its communication with the center 16 (e.g., which may be a facility that is owned and operated by an in-vehicle infotainment unit service provider). Several examples of these services include, but are not limited to: turn-by-turn directions and other navigation-related services provided in conjunction with a location detection module 30; airbag deployment notification and other emergency or roadside assistance-related services provided in connection with various sensor interface modules and sensors located throughout the vehicle 12; and infotainment-related services where music, Web pages, movies, television programs, videogames and/or other content is downloaded by the VCP 28 via a vehicle bus system 32 and an audio bus system (not shown). The listed services are by no means an exhaustive list of all the capabilities of the VCP 28, but are simply an illustration of some of the services that the VCP 28 is capable of offering.

The vehicle bus system 32 may utilize a variety of networking protocols, such as a controller area network (CAN), a media oriented system transfer (MOST), a local interconnection network (LIN), an Ethernet, TCP/IP, and other appropriate connections such as those that conform with known ISO, SAE, and IEEE standards and specifications, to name a few. The vehicle bus system 32 enables the vehicle 12 to send signals (e.g., real-time bus messages, etc.) from the VCP 28 to various units of equipment and systems (e.g., display 48 and speakers 50). The vehicle bus system 32 also enables the vehicle 12 to receive signals at the VCP 28 from various units of equipment and systems (e.g., vehicle sensors (not shown)). An example of a signal received by the vehicle bus 32 includes a historical comfort setting profile received by the server 14. An example of a signal transmitted by the vehicle bus 32 includes a most recently predicted in-vehicle setting to be displayed by the display 48.

As noted above, the VCP 28 may be used for vehicle communications. Some vehicle communications (e.g., between the vehicle 12 and the server 14 at the center 16) utilize radio or satellite transmissions to establish a voice channel with the carrier/communication system 18 such that both voice and data transmissions may be sent and received over the voice channel. In some instances, vehicle communications are enabled through the VCP 28 via a communications module 34, which includes a cellular chipset/component 36 for voice communications and a data transmission system 38 for data transmission.

The cellular chipset/component 36 of the VCP 28 may be an analog, digital, dual-mode, dual-band, multi-mode and/or multi-band wireless transceiver. The cellular chipset-component 36 uses one or more prescribed frequencies in standard analog and/or digital bands in the current market for cellular systems. Any suitable protocol may be used, including digital transmission technologies, such as TDMA (time division multiple access), CDMA (code division multiple access), W-CDMA (wideband CDMA), FDMA (frequency-division multiple access), OFDMA (orthogonal frequency-division multiple access), etc.

In an example, the data transmission system 38 may include a packet builder, which is programmed to make decisions about what packet to send (e.g., bandwidth, data to include, etc.) and to actually build a packet data message. In another example, the data transmission system 38 may include a wireless modem, which applies some type of encoding or modulation to convert the digital data so that it can communicate through a vocoder or speech codec incorporated in the cellular chipset/component 36. It is to be understood that any suitable encoding or modulation technique that provides an acceptable data rate and bit error may be used with the examples disclosed herein. While examples have been provided, it is to be understood that any suitable data transmission system 38 may be used.

The VCP 28 may also be configured for short range wireless communication technologies, such as BLUETOOTH® and various classes thereof, dedicated short-range communications (DSRC), or WI-FI™ and various classes thereof.

The location detection unit 30 may include a GPS receiver, a radio triangulation system, a dead reckoning position system, and/or combinations thereof. In particular, a GPS receiver provides accurate time and latitude and longitude coordinates of the vehicle 12 responsive to a GPS broadcast signal received from a GPS satellite constellation (not shown). The location detection unit 30 may also include, for example, Glonass (i.e., global navigation satellite system), Sbas (i.e., satellite-based augmentation systems), or a D-GPS (differential global positioning system). The location detection chipset/component 30 may or may not be part of an in-vehicle navigation unit.

The VCP 28 may also include a real-time clock (RTC) 40. The real-time clock (RTC) 40 provides accurate date and time information to the VCP 28 hardware and software components that may require and/or request date and time information. In an example, the RTC 40 may provide time and/or date information for any in-vehicle setting change made within the vehicle 12.

The VCP 28 also includes an electronic processing device 42 operatively coupled to one or more types of electronic memory 44. In an example, the electronic processing device 42 is a microprocessor. In other examples, the electronic processing device 42 may be a micro controller, a controller, and/or a host processor. In another example, electronic processing device 42 may be an application specific integrated circuit (ASIC). The electronic memory 44 of the VCP 28 may be an encrypted memory that is configured to store i) an adaptation application 46 to be executed by the processor 42, ii) data associated with the various systems of the vehicle 12 (i.e., vehicle data, VIN, etc.), and the like. The electronic memory 44 may be a non-transitory, tangible computer readable media (e.g., RAM).

In the examples disclosed herein, the adaptation application 46 may autonomously launch in response to the specific user being identified in the vehicle 12 or 12'. The adaptation application 46 collects data related to instances of climate control settings in the vehicle 12, 12' while the user is in the vehicle 12 in order to build up a historical comfort setting profile for the specific user. The adaptation application 46 also uses the historical comfort setting profile to predict in-vehicle setting(s) for the specific user while the user is in the vehicle 12 or 12'. The adaptation application 46 in each of the vehicles 12, 12' is in communication with the server 14, and thus receives information that is specific to the user that is then-currently recognized in the vehicle 12, 12', and can also adapt its output based upon the specific user.

Once launched, the adaptation application 46 is programmed to monitor instances of automatic climate control setting(s), manual climate control setting(s), and/or alternate climate control setting(s).

Automatic climate control settings (sometimes referred to as an AUTO On climate control setting) refer to settings that are automatically implemented by the vehicle heating, ventilating, and air conditioning (HVAC) system 70, which may include a single system or separate front and rear systems. The automatic climate control settings may be the settings that were operable during the last on session of the vehicle 12, or they may be preset preferences that are automatically implemented when a particular in-vehicle occupant is recognized. Manual climate control settings (sometimes referred to as an AUTO Off climate control setting) may be any setting of the HVAC system 70 that the user or another in-vehicle occupant manually inputs while in the vehicle 12. Some of the manual climate control settings may be hybrid manual and automatic climate control settings. A hybrid setting may include a manual setting that is set by the user, as well as other settings that are automatically set by the HVAC system 70 in order to implement the manual setting. For example, when the user sets a cabin temperature, the HVAC system 70 may automatically set the blower mode and fan speed to achieve the manually set cabin temperature. Examples of HVAC system 70 settings include an air condition indication (e.g., on or off), a defrost indication, an interior air temperature setting, blower mode, fan speed, air inlet mode, or the like. The HVAC system 70 may be turned off (e.g., fan speed=0 or switch is set to off), and this setting may be referred to as a Climate Off setting.

As shown in FIG. 1, the HVAC system 70 may be operatively connected to the vehicle bus 32 through a climate control module 72. The climate control module 72 may receive user inputs, through a user interface 52 or manual controls, buttons, knobs, etc. or may retrieve the most recent settings (e.g., stored in an on-board electronic memory), and may transmit signals having different voltages to control one or more components (e.g., change the blower mode/speed, engage the air conditioning compressor clutch, etc.) of the HVAC system 70 to implement newly received or stored climate control settings. In other examples, the HVAC system 70 may have its own HVAC control module as part of the system 70. In these examples, the HVAC control module generates the control signals that control the components of the HVAC system 70. In still other examples, the HVAC system 70 may receive commands from another vehicle module (such as the powertrain control module or the engine control module) to control the system 70 components. For example, the powertrain control module or engine control module may send a command to shut the A/C compressor off during acceleration to send more power to the drivetrain.

Alternate climate control settings refer to other non-HVAC system settings that contribute to cabin comfort, or other vehicle system settings or readings that may be indicative of the climate inside and/or outside of the vehicle 12. Examples of other non-HVAC system settings that contribute to cabin comfort include window settings, sunroof status, heated and/or cooled seat settings, etc. Examples of other non-HVAC system settings or readings that may be indicative of the climate include outside temperature readings, inside temperature readings (e.g., interior roof temperature, interior dash board temperature, etc.), humidity readings, windshield wiper indication or settings, sun intensity, elevation and/or azimuth readings, ambient light status, etc. In some examples, when other non-HVAC system settings are utilized, the HVAC system 70 may be turned off and the adaptation application 46 may recognize the Climate Off setting.

The other non-HVAC systems may include sensors 74. These sensors 74 may vary from one system to the next. The window(s) and/or sunroof may include a sensor that can report when a particular window and/or the sunroof is/are open or closed. The heated and/or cooled seat(s) may include a sensor that can report the status (on or off) of a particular heated and/or cooled seat and/or a sensor that reports the setting (e.g., high, medium, low) of a particular heated and/or cooled seat. Temperature and/or humidity sensors may be positioned inside and/or outside of the vehicle 12 and may report the recorded temperature and/or humidity inside and/or outside of the vehicle 12. The windshield wiper(s) may include a sensor that can report the status (on or off) of the windshield wiper(s) and/or sensor(s) that report the setting (e.g., high, medium, low) of the windshield wiper(s). A UV sensor or pyranometer may be used to detect the sun's intensity, a sun sensor (e.g., from Solar MEMS Technology) may be used to detect the sun's position or elevation with respect to the sun sensor's position, and/or a position sensor may be used to determine the sun's azimuth.

Each sensor 74 of the vehicle 12 is operatively connected to the vehicle bus 32, either directly or through a sensor interface module 76. An example of the sensor interface module 76 is a body control module, which may monitor and control various electronic accessories, such as the windows, sunroof, heated and/or cooled seats, windshield wipers, etc.

The modules 72, 76 may be hardware modules that are capable of sending commands that are implemented by other systems or of transforming raw data into signals usable by the adaptation application 46, or they may be software modules that cause a hardware device to communicate encoded commands over the bus 32, where the commands are received and decoded by a receiving hardware device and converted to a control signal by the receiver.

As mentioned above, the adaptation application 46 is programmed to monitor instances of the automatic climate control setting(s), the manual climate control setting(s), and/or alternate climate control setting(s). The adaptation application 46 monitors these instances and collects relevant data from the sensors 74 through the vehicle bus 32. The phrase "climate control setting instance" as used herein may refer to any one or more of the automatic climate control setting(s), the manual climate control setting(s), and/or alternate climate control setting(s). The adaptation application 46 monitors the climate control activity every half second while the specific user is in the vehicle 12 or 12'. When the HVAC system 70 automatically adjusts or changes a climate control setting, when a user manually adjusts or changes a climate control setting, or when an alternate climate control setting is adjusted, changed (e.g., a window or sunroof status changes), or reported (e.g., an updated sun position, ambient light status, etc. is received), the adaptation application 46 recognizes that the adjustment, change, or report is being made and collects data associated with the particular climate control setting instance. The adaptation application 46 may also be programmed to collect the current state of the HVAC system 70 and vehicle 12 at predetermined/regular intervals (e.g., every 5 minutes when the user is nit eh vehicle 12, 12'). As such, the adaptation application 46 may collect data even when a particular climate control setting instance is not recognized. This will ensure that individual comfort setting records are recorded when the user in the vehicle 12, 12', even in the absence of a particular climate control setting instance.

For each climate control setting instance that is recognized and/or at the predetermined interval, the adaptation application 46 collects the location of the vehicle 12 or 12' (i.e., a vehicle location data point), the time/date (i.e., a time/date data point), and at least one climate control related setting (e.g., the type of setting that is being adjusted, changed, or reported).

The vehicle location data point may be received at the adaptation application 46 from the location detection unit 30. The vehicle location data point(s) may include a latitude data point of the vehicle 12, 12', a longitude data point of the vehicle 12, 12', an elevation data point of the vehicle 12, 12', or combinations thereof. The location detection unit 30 may include an admissible error value for the computation of the location data point in order to compensate, in part, for the vehicle's movement. The vehicle location data point may be received/collected several times during a single instance. It may be desirable to receive/collect multiple vehicle location data points during a single instance because the vehicle 12, 12' may be moving while the climate control setting is implemented. In an example, the vehicle location data point may be received by the location detection unit 30 each second that it takes for a window to be opened (which may take from 1-5 seconds). In this example, the adaptation application 46 may receive from 1 vehicle location data points (e.g., if 1 location data point is received per second for 1 second) to 15 vehicle location data points (e.g., if 3 location data points are received per second for 5 seconds) for climate control setting instance. Collecting multiple location data points for one climate control setting instance may help to improve the accuracy of the predictions that are subsequently made by the adaptation application 46. It is to be understood that some climate control setting instances may take 1 second or less (e.g., adjusting the in-vehicle temperature, receiving a sun intensity reading, etc.), and thus a maximum of 3 vehicle location data points (e.g., if 3 location data points are received per second for 1 second).

The time/date data point may be received from the real-time clock (RTC) 40. The time/date data point may include a calendar day on which the climate control setting instance is recognized or the data is collected for a predetermined/regular interval, and/or a time of the day at which the climate control setting instance is recognized or the data is collected for a predetermined/regular interval. The time of the day may be the hour (e.g., 1-24), or the minute and the hour, or the second, the minute, and the hour. If several vehicle location data points are collected, corresponding time/date data points may also be collected.

The at least one climate control related setting associated with the instance (e.g., the type of setting that is being adjusted, changed, or reported) or implanted at the predetermined/regular interval may be received at the adaptation application 46 from the climate control module 72 or the sensor interface module 76. The climate control module 72 monitors adjustments or changes made by the HVAC system 74 (either automatically or in response to a user input) and can report the type of adjustment or change to the adaptation application 46. The sensor interface module 76 monitors adjustments or changes made by the non-HVAC systems and receives data from sensors 70, and can report the type of adjustment, change, or data to the adaptation application 46. As mentioned above, the data may be received by the adaptation application 46 through the vehicle bus 32.

Examples of the climate control related setting that may be received by the adaptation application 46 include an outside air temperature data point, an outside humidity data point, an air conditioner indication, a humidity glass temperature data point, an interior air temperature data point, an interior roof temperature data point, an interior dash temperature data point, a wiper indication, a sun intensity data point, a sun elevation data point, a sun azimuth data point; an ambient light status indication, a window status indication, a front or rear blower mode, a fan speed, a thermal seat indication and/or setting, a zone control indication, an air inlet mode, a front and/or rear defog indication, a driver temperature setting, or combinations thereof.

Other vehicle data recorded at the time of the climate control setting instance and/or at the predetermined/regular interval may be collected. One example is the speed at which the vehicle 12 is traveling when the climate control setting instance is recognized or at the predetermined/regular interval. Another example is passenger presence data, which indicates the number of passengers (if any) travelling in the vehicle 12 when the climate control setting instance is recognized or at the predetermined/regular interval. The vehicle sensors 74 may be used to receive passenger presence data. In one example, the passenger presence data is collected by a seat belt sensor, which determines whether a passenger seat belt has been fastened. In another example, the passenger presence data is collected by an ultrasonic sensor, which uses ultrasonic wave to determine if a human shape is in a passenger seat. In another example, the passenger presence data is collected by an automatic occupancy sensor, which determines whether a passenger is present in the vehicle 12 by sensing the amount of weight upon a passenger seat. In still another example, the passenger presence data is collected by a camera, which looks for passengers within the vehicle 12.

After the data for the climate control setting instance is collected, the adaptation application 46 generates a comfort setting record for the climate control setting instance. The comfort setting record includes the data points (i.e., location and time/date data points for the climate control setting instance) and the climate control related setting(s). The comfort setting record also identifies the specific user. This enables the server 14 to update the historical comfort setting profile of the specific user. The server 14 will be described in more detail below. The comfort setting record may also include vehicle data, such as the speed at which the vehicle 12 was traveling when the climate control related setting was recognized or at the predetermined/regular interval.

It is to be understood that the adaptation application 46 may collect data and generate a comfort setting record for each instance of a climate control setting that is recognized while the specific user is in the vehicle 12, 12'. In a single trip (i.e., from vehicle on to vehicle off), any number of climate control setting instances and corresponding comfort setting records may be made and generated. The adaptation application 46 may also or alternatively generate comfort setting records at regular intervals while the specific user is in the vehicle 12, 12'. For example, the current state of the HVAC system 70 and vehicle 12, 12' may be captured and converted into a numeric vector that includes the time in the vehicle 12, 12', the current speed, speed variance, vehicle location, time of day, outside temperature, cabin temperature, fan speed, and/or other climate control settings.

The adaptation application 46 transmits the comfort setting record(s) to the server 14 for storage in the specific user's historical comfort setting profile (which is a consolidation of the specific user's comfort setting records). To transmit the comfort setting record(s), the adaptation application 46 utilizes the VCP's communications module 34. During a vehicle data upload event, the communications module 34 transmits the comfort setting record(s) as packet data to the server 14. The comfort setting record may be transmitted immediately after it is generated, or all comfort setting record(s) during a single driving event may be transmitted together at the end of the event (as signaled by the vehicle engine being powered down, turned off, etc.).

Any later time the specific user enters the vehicle 12 or another vehicle 12' that is capable of recognizing him/her and is equipped with the adaptation application 46, the respective adaptation application 46 collects data for each climate control setting instance detected while the specific user is in the vehicle 12, 12', and generates a corresponding comfort setting record. As such, the user's historical comfort setting profile is regularly updated, regardless of which vehicle 12, 12' he/she is using. The function of updating the historical comfort setting profile may be performed simultaneously (e.g., in the background) with other functions that are performed by the adaptation application 46.

The adaptation application 46 is also capable of using the historical comfort setting profile of the specific user to dynamically predict in-vehicle settings(s) for the specific user.

When the user is identified in the vehicle 12, 12' (as previously described herein) and the adaptation application 46 launches in response, the historical comfort setting profile for the specific user is automatically downloaded to the adaptation application 46. When the VCP 28 identifies the specific user, the server 14 may automatically download the historical comfort setting profile in response to a request from the VCP 28. The request may include the identity of the specific user. When the server 14 identifies the specific user, the server 14 may transmit the historical comfort setting profile to the adaptation application 46 along with the identity of the specific user.

In an example, the adaptation application 46 receives a request (e.g., via a user input at the user interface 52) from the user for the predicted in-vehicle setting(s). In another example, the adaptation application 46 may routinely update the predicted in-vehicle setting(s) (e.g., at predetermined intervals) while the user is in the vehicle 12, 12'.

To generate the predicted in-vehicle setting(s) for the specific user, the adaptation application 46 dynamically determines a probability of a particular in-vehicle setting being chosen while the specific user is in the vehicle 12 or 12'. The probability is dependent upon all of the data from the comfort setting record(s) in the historical comfort setting profile. As such, the prediction is based upon location data points, time/date data points, and a set of climate control related settings retrieved from the individual comfort setting record(s). The probability, and thus the accuracy which is directly proportional to the probability, may be increased in the examples disclosed herein because the data taken into account includes the location of the vehicle 12, 12' when prior climate control settings were implemented, as well as the date/time those climate control settings were implemented.

The adaptation application 46 retrieves data from comfort setting records within a predetermined time frame (e.g., 2 weeks, 3 months, etc. prior to the current date). The predetermined time frame is a window period within which the historical comfort setting data is considered suitable for modeling the behavior of the user. The window period may be a fixed period based on date. The accuracy of the prediction is a function, in part, of the instances or the predetermined/regular intervals. As the frequency of instances or predetermined/regular intervals increases, then the number of instances or intervals increases, and the window period may be reduced. If the user frequently implements similar climate control settings or the predetermined/regular intervals are close together, the window period may be shorter than if the climate control settings are rarely adjusted or the or predetermined/regular intervals are further apart. The adaptation application 46 may automatically update the window period based upon the specific user's historical comfort setting profile. Additionally, any data outside this window period is considered stale and is not retrieved for use by the adaptation application 46. The adaptation application 46 may also flag any stale comfort setting records, and the server 14 may discard these particular records from the specific user's historical comfort setting profile.

Generally, the adaptation application 46 associates probabilities to candidate climate control settings (as determined by the specific user's historical comfort setting profile) at a requested time, or according to a predetermined schedule while the user is in the vehicle 12.

More specifically, the adaptation application 46 utilizes the retrieved data as training data for a machine learning algorithm and for building a prediction model. The prediction model is a product of applying the machine learning algorithm on the given data. The machine learning algorithm does not utilize any forward looking data to build the prediction model and make the prediction. In an example, the machine learning algorithm is C4.5 or J48 (i.e., open source Java implementation of the C4.5 algorithm), each of which builds decision trees from the training data. Other suitable machine learning algorithms include Random forest, Hoeffding tree, modified Naïve-Bayes, and the like. In an example, a modified form of an Incremental Naïve-Bayes classifier may be used to assign discrete and continuous input states and to determine the likelihood of an action (e.g., instance) that would change the state of HVAC system. With the decision trees, the machine learning algorithm, and the prediction model built therefrom, can classify an unknown instance (i.e., predict the probability of a climate control setting being selected while the user is in the vehicle 12, 12'). The output of the prediction model is a prediction classifier. In the examples disclosed herein, the prediction classifier includes one or more climate control setting(s) that is/are likely to be implemented at a particular instance while the specific user is in the vehicle 12, 12'.

In an example, a probability is generated for each climate control related setting in the data that is analyzed from the historical comfort setting profile. An error distribution may be included for each predicted climate control related setting. Any number of probable climate control related settings may be included in the setting(s) that are presented to the specific user.

The adaptation application 46 may dynamically determine the probability of a climate control related setting being chosen for an in-vehicle setting within predetermined time increments. As such, at the end of one predetermined time increment, the adaptation application 46 retrieves data from the historical comfort setting profile (which may have been recently updated if changes or adjustments have been made, or new data is reported), and runs the prediction model to update the predicted in-vehicle setting(s) for the next predetermined time increment. This process is repeated for each predetermined time increment that the specific user is in the vehicle 12, 12'. In an example, the predetermined time increment is every minute that the specific user is in the vehicle 12, 12'. In this example, the predicted in-vehicle setting(s) will be updated every minute. In another example, the predetermined time increment is every 7 seconds that the specific user is in the vehicle 12, 12'.

Rather than routinely updating the predicted in-vehicle setting(s) or at some point in between routine updates, the adaptation application 46 may dynamically determine the probability of particular in-vehicle setting(s) being chosen upon receiving a request from an in-vehicle occupant.

Figure 2:
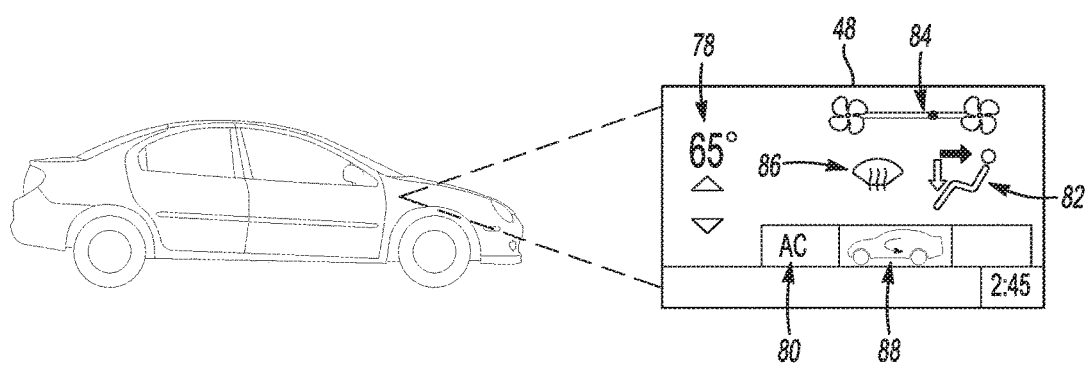
FIG. 2 is a schematic view of an in-vehicle display displaying a most recently predicted in-vehicle setting.

The adaptation application 46 commands the display 48 to display the predicted in-vehicle setting(s). Any number of predicted in-vehicle settings can be displayed. Although the number displayed may depend upon the size of the user interface 52, and the number of setting(s) that that will fit into the user interface 52 without the user having to scroll down. In some instances, the predicted in-vehicle settings that are displayed have at least a 10% probability of being implemented. The prediction confidence threshold percentage may be higher, e.g., ranging from about 30% to about 55%. The probability for each predicted in-vehicle setting is independent of the probabilities for each other predicted in-vehicle settings. The display 48 may depict the predicted in-vehicle setting and the predicted time that the predicted in-vehicle setting(s) is/are likely to be implemented. An example of this is shown in FIG. 2, where the predicted in-vehicle air temperature is 65° C. and the predicted air conditioner status is on (as shown at reference numerals 78 and 80), the predicted blower mode is on at the face level and the predicted fan speed is medium (as shown at reference numerals 82 and 84), the predicted front defrost/defog setting is off (as shown at reference numeral 86), the predicted air distribution is active (as shown at reference numeral 88). In this example, these climate control settings have the highest probability of being implemented at the given time and at the vehicle's then-current location, where the probability is based upon historical comfort setting records of the specific user. The predicted settings may also be presented in the form of a list, with the setting name, an active or inactive status, and/or a predicted number (e.g., temperature), mode (e.g., high, medium, low, open, closed, etc.) or the like that is predicted for the setting.

While several examples of the predicted climate control settings have been provided in FIG. 2, it is to be understood that other climate control settings may be predicted. Examples of other climate control settings that may be predicted include any other setting of the HVAC system 70 (e.g., zone control settings, air inlet mode, rear defrost/defog, heater status, driver and/or passenger temperature settings, etc.), window settings, sunroof settings, heated and/or cooled seat settings, or the like.

Because, in some examples, the predicted climate control setting(s) is/are updated for every time increment while the user is in the vehicle 12, 12', the display 48 may be constantly changing. However, if the predicted climate control setting(s) does/do not change from one time increment to the next, the display 48 will maintain the previously displayed predicted climate control setting(s), but may update the predicted time at which the predicted climate control setting(s) is/are likely to be selected. In other examples, the predicted climate control setting(s) is/are updated in response to a user request, and thus will be updated when the request is received and processed.

In an example, the display 48 is a full-color touch screen display. Other examples of the display 48 include a VFD (Vacuum Fluorescent Display), an LED (Light Emitting Diode) display, an LCD (Liquid Crystal Diode) display, and/or the like. In an example, the speaker 50 is a speaker of the user interface 52 as shown in FIG. 1. In other examples, the speaker 50 may be a standalone speaker or a vehicle speaker (not shown).

The display 48 may be part of a user interface 52. The user interface 52 is operatively connected to the vehicle bus system 32. The user interface 52 allows the specific user to input information and commands to the vehicle 12 (e.g., the adaptation application 46) and receive information from the vehicle 12 (e.g., the prioritized list from the adaptation application 46). The user interface 52 may be any command-driven user interface or any menu-driven interface. In an example, the user interface 52 is a graphical user interface (GUI). In another example, the user interface 48 is a human machine interface (HMI). As shown in FIG. 1, in addition to the display 48, the user interface 48 may also include the speaker 50. The user interface 52 may also include a microphone (not shown).

The user interface 52 may assist the VCP 28 with a variety of services. One example of these services includes the user interface 52 allowing the specific user to select to implement one or more of the predicted climate control settings from the displayed most recently generated predicted climate control setting(s). As examples, the specific user may tap, at the user interface 52, a single icon to implement all of the predicted settings or may tap, at the user interface 52, a particular setting that he/she would like to implement. The selected setting(s) is/are then transmitted to the appropriate module 72, 76, which commands the appropriate in-vehicle system (e.g., windows, sunroof, HVAC system 70, seats, etc.) to implement the setting. In response, the appropriate system autonomously changes a then-current setting to the selected in-vehicle setting or checks to see of the then-current setting matches the selected in-vehicle setting.

The system 10 also includes the previously mentioned server 14. As shown in FIG. 1, the server 14 may be located at the center 16 that provides back-end services to the vehicles 12, 12'. The server 14 may be a dedicated server that participates in servicing the adaptation application 46. For example, the server 14 assists in determining the predicted climate control setting(s) for the specific user by storing the most up-to-date historical comfort setting profile and supplying the historical comfort setting profile to the vehicle 12, 12' that the specific user is then-currently located in.

Upon receiving a comfort setting record, the server 14 matches the comfort setting record with a profile of the specific user, and updates the historical comfort setting profile of the specific user with the comfort setting record. The server 14 is also programmed to delete any stale comfort setting records (i.e., outdated records that are no longer useful for the machine learning algorithm and prediction model).

Upon receiving a request, the server 14 is programmed to respond to the request either by identifying the specific user (through the mobile device identifier received in the request) and retrieving the specific user's historical comfort setting profile, or by retrieving the historical comfort setting profile of the specific user identified in the request.

The server 14 is a system of computer hardware (e.g., central processing unit 54) and computer readable instructions that is capable of receiving and storing the comfort setting record(s) and that is capable of responding to requests received from the adaptation application 46. The central processing unit 54 may be a controller, a host processor, or an ASIC. The central processing unit 54 is capable of executing the computer readable instructions of an adaptation service program stored on an electronic memory 56 of the central server 14.

The server 14 may receive individual comfort setting record(s) and/or requests from the vehicle 12, 12' and/or transmit data (e.g., the specific user's historical comfort setting profile) through the carrier/communication system 18. More specifically, the server 14 also includes a server communication transceiver 58 that is in selective communication with the VCP 28. The server communication transceiver 58 may be any suitable data transmission system that is capable of sending and/or receiving data communications over the carrier/communication system 18. For example, the server communication transceiver 58 is capable of receiving the comfort setting record(s) and the request(s) from the adaptation application 46 (and the VCP 28), and is capable of transmitting the specific user's historical comfort setting profile (alone or in combination with the specific user's identify) back to the adaptation application 46.

In addition to the server 14, the center 16 may also include other components, such as additional computing equipment 60, switch(es) 62, advisor(s) (not shown), database(s) 64, and a network connection or bus 68.

The center computing equipment 60, which is often used in conjunction with telecommunication equipment (not shown), is generally equipped with suitable hardware and software and/or programs enabling the hardware of the computing equipment 60 to accomplish a variety of center functions. The computing equipment 60 may be programmed to carry out some of the tasks/operations of the center 16. The telecommunication and computing equipment 60 may include a network of servers (including server 14) coupled to both locally stored and remote databases (e.g., database 64) of any information processed.

The center 16 may also include switch(es) 62. The switch 62 may be a private branch exchange (PBX) switch. The switch 62 routes incoming signals so that voice transmissions are usually sent to either a live advisor or the automated response system, and data transmissions are passed on to a modem or other piece of equipment (e.g., a communications module) for demodulation and further signal processing. The modem may include an encoder, and may be connected to various devices such as the server 14 and database 64.

The center 16 also includes live and/or automated advisors (not shown). Each advisor may be associated with a workstation, including telecommunication and computing equipment 60.

The database(s) 64 at the center 16 may be designed to store vehicle record(s), subscriber/user profile records (including the historical comfort setting profile), or any other pertinent subscriber and/or vehicle information and/or mobile device information. In an example, the database(s) 64 may be configured to store the user profile, which may contain personal information of the subscriber/user 14 (e.g., the subscriber's name, garage/home address, billing address, home phone number, cellular phone number/mobile dialing number, etc.), his/her historical comfort setting profile, etc. The server 14 may utilize the information in the database to determine which specific user the adaptation application 46 is trying to identify, and/or which historical comfort setting profile is associated with the identified specific user.

It is to be understood that the databases 64 may allow the center 16 to function as a repository for data collected from the vehicle 12, 12'. In some instances, another facility may function as a repository for the collected data (e.g., a customer relationship management system (not shown) associated with the center 16 whose database(s) the server 14 or advisors can access).

As illustrated in FIG. 1, the various call center components are coupled to one another via a network connection or bus 68, which may be similar to the vehicle bus 32 previously described.

It is to be appreciated that the center 16 may be any central or remote facility, manned or unmanned, mobile or fixed, to or from which it is desirable to exchange voice and data communications. As such, the live advisor may be physically present at the center 16 or may be located remote from the center 16 while communicating therethrough.

The center 16 shown in FIG. 1 may also be virtualized and configured in a Cloud Computer, that is, in an Internet-based computing environment. For example, the computer equipment 60 may be accessed as a Cloud platform service, or PaaS (Platform as a Service), utilizing Cloud infrastructure rather than hosting computer equipment 60 at the center 16. The database 64 and server 14 may also be virtualized as a Cloud resource. The Cloud infrastructure, known as IaaS (Infrastructure as a Service), typically utilizes a platform virtualization environment as a service, which may include components such as the computing equipment 60, database 64, server 14, and other computer equipment. In an example, the determination as to the identity of the specific user and/or the retrieval of the historical comfort setting profile disclosed herein may be performed in the Cloud via the SaaS (Software as a Service).

It is to be understood that the term "communication" as used herein is to be construed to include all forms of communication, including direct and indirect communication. Indirect communication may include communication between two components with additional component(s) located therebetween.

Further, the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from 1 second to 5 seconds should be interpreted to include the explicitly recited limits of from 1 second to 5 seconds, as well as individual values, such as 2 seconds, 3.5 seconds, 4.5 seconds, etc., and sub-ranges, such as from about 2 seconds to about 4 seconds, from about 1.5 seconds to about 3 seconds, etc.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method for personalizing vehicular comfort settings for a specific user, the method comprising:
   in response to identifying the specific user in a vehicle, autonomously launching an adaptation application in the vehicle;
   upon launching the adaptation application, automatically downloading a historical comfort setting profile for the specific user, the historical comfort setting profile including individual comfort setting records;
   autonomously updating the historical comfort setting profile with a comfort setting record corresponding to each instance of an automatic climate control setting, a manual climate control setting, or an alternate climate control setting while the specific user is in the vehicle;
   dynamically predicting an in-vehicle setting within respective predetermined time increments while the specific user is in the vehicle or in response to a user request, the predicted in-vehicle setting and the respective predetermined time increments based upon geographic location data points and a set of climate control related settings retrieved from the individual comfort setting records corresponding to the specific user, wherein a time period for the respective predetermined time increments is inversely proportional to a frequency of implementations of a comfort setting initiated by the specific user; and
   causing a most recently predicted in-vehicle setting corresponding to the specific user to be displayed on a vehicle display while the specific user is in the vehicle.

2. The method as defined in claim 1 wherein the set of climate control related settings retrieved from each of the individual comfort setting records includes at least one of: an outside air temperature data point; an outside humidity data point; an air conditioner indication; a humidity glass temperature data point; an interior air temperature data point; an interior roof temperature data point; an interior dash temperature data point; a wiper indication; a sun intensity data point; a sun elevation data point; a sun azimuth data point; an ambient light status indication; a window indication; a blower mode; a fan speed; a thermal seat setting; a zone control indication; an air inlet mode; a front or rear defog indication; or a driver temperature setting.

3. The method as defined in claim 1, further comprising:
   receiving an input to accept the most recently predicted in-vehicle setting; and
   in response to the input, autonomously changing a then-current setting to the predicted in-vehicle setting.

4. The method as defined in claim 1 wherein the dynamically predicting of the in-vehicle setting includes:
   determining a first predicted in-vehicle setting for a first of the respective predetermined time increments; and
   while the specific user is in the vehicle, determining a second predicted in-vehicle setting within a next of the respective predetermined time increments upon an expiration of the first of the respective predetermined time increments, the next of the respective predetermined time increments based upon a plurality of implementations of a comfort setting, each implementation of the plurality of implementations initiated by the specific user.

5. The method as defined in claim 1 wherein each of the geographic location data points is selected from the group consisting of a latitude data point, a longitude data point, and an elevation data point.

6. The method as defined in claim 1 wherein the alternate climate control setting includes a change in a window status or a change in a sunroof status.

7. The method as defined in claim 1 wherein the dynamically predicting of the in-vehicle setting includes dynamically predicting at least one of a window setting, a front blower mode, a front fan speed, a thermal seat setting, a zone control setting, an air inlet mode, a rear defog setting, or a driver temperature setting.

8. The method as defined in claim 1, further comprising: identifying the specific user within the vehicle based upon a mobile device associated with the specific user.

9. The method as defined in claim 8, wherein identifying the specific user further comprises identifying the specific user within the vehicle based upon a mobile device associated with the specific user, wherein a vehicle communications platform retrieves the specific user based upon a mobile device identifier corresponding to the mobile device.

10. A vehicle comfort setting personalization method, comprising:
   at a first time, recognizing that a specific user is in a first vehicle containing an adaptation application;
   monitoring climate control settings every half second while the specific user is in the first vehicle;
   upon recognizing, by the monitoring, an instance of an automatic climate control setting, a manual climate control setting, or an alternate climate control setting:
      collecting a first vehicle location data point, a time/date data point, and at least one climate control related setting associated with the first vehicle; and
      generating a first comfort setting record including the data points and the at least one climate control related setting;
   at a second time, recognizing that the specific user is in a second vehicle containing the adaptation application, the second vehicle being different from the first vehicle;
   monitoring climate control settings every second while the specific user is in the second vehicle;
   upon recognizing, by the monitoring, another instance of an automatic climate control setting, a manual climate control setting, or an alternate climate control setting:
      collecting a second vehicle location data point, a time/date data point, and at least one climate control related setting associated with the second vehicle; and
      generating a second comfort setting record including the data points and the at least one climate control related setting;
   consolidating the first and second comfort setting records into a historical comfort setting profile for the specific user; and
   at a third time, using the historical comfort setting profile to dynamically predict an in-vehicle setting within respective predetermined time increments while the specific user is in the first vehicle, the second vehicle, or a third vehicle or in response to a request while the specific user is in the first vehicle, the second vehicle, or the third vehicle, wherein a time period for the respective predetermined time increments is inversely proportional to a frequency of implementations of a comfort setting initiated by the specific user.

11. The vehicle comfort setting personalization method as defined in claim 10 wherein:
   the first vehicle location data point is selected from the group consisting of a latitude data point for the first vehicle, a longitude data point for the first vehicle, and an elevation data point for the first vehicle; and
   the second vehicle location data point is selected from the group consisting of a latitude data point for the second vehicle, a longitude data point for the second vehicle, and an elevation data point for the second vehicle.

12. The vehicle comfort setting personalization method as defined in claim 10 wherein:
   the collecting of the time/date data point associated with the first vehicle includes collecting a calendar day and a time of day at which the instance is recognized; and
   the collecting of the time/date data point associated with the second vehicle includes collecting a calendar day and a time of day at which the other instance is recognized.

13. The vehicle comfort setting personalization method as defined in claim 10 wherein prior to using the historical comfort setting profile to dynamically predict the in-vehicle setting, the method further comprises retrieving geographic location data points, time/date data points, and a set of climate control related settings from individual comfort setting records, and wherein the predicted in-vehicle setting is dependent upon geographic location data points and a set of climate control related settings retrieved from the individual comfort setting records.

14. The vehicle comfort setting personalization method as defined in claim 13 wherein the set of climate control related settings retrieved from each of the individual comfort setting records includes at least one of: an outside air temperature data point; an outside humidity data point; an air conditioner indication; a humidity glass temperature data point; an interior air temperature data point; an interior roof temperature data point; an interior dash temperature data point; a wiper indication; a sun intensity data point; a sun elevation data point; a sun azimuth data point; an ambient light status indication; a window indication; a blower mode; a fan speed; a thermal seat setting; a zone control indication; an air inlet mode; a front or rear defog indication; or a driver temperature setting.

15. The vehicle comfort setting personalization method as defined in claim 10, further comprising causing a most recently predicted in-vehicle setting to be displayed on a vehicle display of the first vehicle, the second vehicle, or the third vehicle while the specific user is in the first vehicle, the second vehicle, or the third vehicle.

16. The vehicle comfort setting personalization method as defined in claim 10 wherein the dynamically predicting of the in-vehicle setting includes dynamically predicting any of a window setting, a front blower mode, a front fan speed, a thermal seat setting, a zone control setting, an air inlet mode, a rear defog setting, a driver temperature setting, or combinations thereof.

17. The vehicle comfort setting personalization method as defined in claim 10, wherein the recognizing that the specific user is in at least one of the first vehicle or the second vehicle further comprises recognizing that the specific users is in at least one of the first vehicle or the second vehicle based upon a mobile device associated with the specific user.

18. A vehicle comfort setting personalization system, comprising:
   a server; and a vehicle that is remote from the server, the vehicle including:
a recognition system to recognize a specific user;
a display;
a vehicle communications platform including a microprocessor and a memory; and
an adaptation application stored on the memory and executed by the microprocessor to cause the microprocessor to:
autonomously launch in response to the recognition system identifying the specific user;
automatically download, from the server, a historical comfort setting profile for the specific user, the historical comfort setting profile including individual comfort setting records;
autonomously update the historical comfort setting profile with a comfort setting record corresponding to each instance of an automatic climate control setting, a manual climate control setting, or an alternate climate control setting while the specific user is in the vehicle;
dynamically predict an in-vehicle setting within respective predetermined time increments while the specific user is in the vehicle or in response to a user request, the predicted in-vehicle setting and the respective predetermined time increments based upon geographic location data points and a set of climate control related settings retrieved from the individual comfort setting records corresponding to the specific user, wherein a time period for the respective predetermined time increments is inversely proportional to a frequency of implementations of a comfort setting initiated by the specific user; and
cause a most recently predicted in-vehicle setting corresponding to the specific user to be displayed on the display while the specific user is in the vehicle.

19. The vehicle comfort setting personalization system as defined in claim 18, wherein the recognition system recognizes the specific user based upon a mobile device associated with the mobile device.

20. The vehicle comfort setting personalization system as defined in claim 18, wherein the recognition system recognizes the specific user based upon a mobile device identifier corresponding to the mobile device.

* * * * *